(12) United States Patent
Kertz (10) Patent No.: US 8,234,814 B2
(45) Date of Patent: Aug. 7, 2012

(54) PLANT GROWING ASSEMBLY

(75) Inventor: Malcolm Glen Kertz, El Paso, TX (US)

(73) Assignee: Malcolm Glen Kertz, El Paso, TX (US)

( * ) Notice: Subject to any disclaimer, the term of this patent is extended or adjusted under 35 U.S.C. 154(b) by 269 days.

(21) Appl. No.: 12/510,635

(22) Filed: Jul. 28, 2009

(65) Prior Publication Data
US 2010/0024292 A1    Feb. 4, 2010

Related U.S. Application Data

(60) Provisional application No. 61/084,311, filed on Jul. 29, 2008.

(51) Int. Cl.
| | |
|---|---|
| A01G 9/02 | (2006.01) |
| A01G 25/00 | (2006.01) |
| A01G 9/00 | (2006.01) |
| A47G 7/02 | (2006.01) |

(52) U.S. Cl. ..................... 47/67; 47/79; 47/17
(58) Field of Classification Search ............... 47/17, 33, 47/39, 47, 67, 82, 83, 65, 79, 48.5
See application file for complete search history.

(56) References Cited

U.S. PATENT DOCUMENTS

| | | |
|---|---|---|
| 1,914,967 A | 6/1933 | Bebb |
| D140,519 S | 3/1945 | Pascal |
| 3,160,986 A | 12/1964 | Watson et al. |
| 3,172,234 A | 3/1965 | Eavis |
| 3,207,421 A | 9/1965 | Hunger et al. |
| 3,384,993 A | 5/1968 | Kane |
| 3,568,853 A | 3/1971 | Feibelman |
| 3,613,309 A | 10/1971 | Coburn |
| 3,739,522 A | 6/1973 | Greenbaum |
| 3,749,237 A | 7/1973 | Dorton |
| 3,872,621 A | 3/1975 | Greenbaum |
| 3,924,781 A | 12/1975 | Witte |
| 4,034,508 A | 7/1977 | Dedolph |
| 4,075,785 A | 2/1978 | Jones |
| 4,163,342 A | 8/1979 | Fogg et al. |
| 4,251,951 A | 2/1981 | Heinstedt |
| 4,255,897 A | 3/1981 | Ruthner |
| 4,258,501 A | 3/1981 | Brown |
| 4,311,477 A | 1/1982 | Kitamura et al. |
| 4,316,347 A | 2/1982 | Smith |
| 4,356,664 A | 11/1982 | Ruthner |
| 4,424,645 A | 1/1984 | Rannali |

(Continued)

FOREIGN PATENT DOCUMENTS

AT    241191    11/1964

(Continued)

OTHER PUBLICATIONS

Online: Retrieved from the Internet on May 11, 2010; CNN Money.com; "Walls You Can Eat"; (2 p.).

(Continued)

*Primary Examiner* — Monica Williams
(74) *Attorney, Agent, or Firm* — Conley Rose, P.C.

(57) ABSTRACT

An apparatus and method for growing plants in a growing room includes a hanging member having a substantially planar configuration, oriented vertically. At least one carriage is disposed on the hanging member to support growing plants. A nutrient delivery system has a conduit to deliver nutrients to the hanging member and to recycle any unused nutrients.

27 Claims, 6 Drawing Sheets

U.S. PATENT DOCUMENTS

| | | | |
|---|---|---|---|
| 4,629,070 A | 12/1986 | Roberg | |
| 4,908,315 A | 3/1990 | Kertz | |
| 4,911,777 A | 3/1990 | Truc et al. | |
| 4,938,368 A | 7/1990 | Sharman | |
| 4,965,962 A | 10/1990 | Akagi | |
| 4,978,505 A | 12/1990 | Kertz | |
| 5,088,231 A | 2/1992 | Kertz | |
| 5,171,683 A | 12/1992 | Kertz | |
| 5,464,456 A | 11/1995 | Kertz | |
| 5,511,340 A | 4/1996 | Kertz | |
| 5,664,369 A | 9/1997 | Kertz | |
| 6,122,861 A | 9/2000 | Kertz | |
| 6,173,529 B1 | 1/2001 | Kertz | |
| 6,634,138 B2 * | 10/2003 | Katzman | 47/79 |
| 2008/0000153 A1 * | 1/2008 | Sugiyama et al. | 47/47 |

FOREIGN PATENT DOCUMENTS

| | | |
|---|---|---|
| DE | 3310883 | 9/1984 |
| DE | 3634805 | 4/1988 |
| EP | 0031985 | 7/1981 |
| EP | 0042697 | 12/1981 |
| EP | 0220348 | 6/1987 |
| EP | 0282230 | 9/1988 |
| EP | 1803346 | 7/2007 |
| FR | 1475610 | 2/1967 |
| FR | 2621448 | 4/1989 |
| GB | 714638 | 9/1954 |
| GB | 1457920 | 12/1976 |
| GB | 2236669 | 4/1991 |
| JP | 2000-023574 | 1/2000 |
| KR | 10-19990068775 | 9/1999 |
| KR | 20-0233120 | 9/2001 |
| KR | 20-0382117 | 4/2005 |
| NL | 8401090 | 11/1985 |
| NL | 8402614 | 3/1986 |
| SU | 1034218 | 12/1985 |
| WO | WO 8705885 | 8/1987 |
| WO | WO 8806402 | 9/1988 |
| WO | WO 8900377 | 1/1989 |

OTHER PUBLICATIONS

PCT International Search Report and Written Opinion dated Apr. 27, 2010, Korean Intellectual Property Office, Application No. PCT/US2009/051949 (12 pp).
Chevron Chemical Co.; Chevron Polyethylene Resins for Extrusion; (8 pp).
Chevron Chemical Co.; Technical Data Sheet; High Density Polythylene Blow Molding Resin; HiD 9506 (2 pp).
Chevron Chemical Co.,; Technical Data Sheet; High Density Polyethylene Blown Film Resin; HiD9650 (2 pp).
Chevron Chemical Co.,; Technical Data Sheet; Low Density Polyethylene High Clarity, High Impact Film Resin for General Purposes Packaging; PE 5754 ( 2pp).
Biotechnology Letters; vol. 7, No. 7; pp. 467-470 (1985); A Device for Cultivation of Plant and Animal Cells; Jan Kybal and Bohumil Sikytra.
Modern Plastics; vol. 34, Sep. 1956; Film on the Farm; (13 pp).
Horticulture; vol. XXXI, Sep. 1953; Gardening With Plastics; George Taloumis.
Acta Horticulturae 178, 1986; Vertical Bag System Used for Mother Foliage Pot Plants Culture, Effects of Substrates; pp. 245-256.
Office Action dated Apr. 19, 1993, U.S. Appl. No. 07/943,264 (6 pp).
Response to Office Action dated Apr. 19, 1993, U.S. Appl. No. 07/943,264 (4 pp).
Office Action dated Jun. 18, 1993, U.S. Appl. No. 07/943,264 (6 pp).
Response to Office Action dated Jun. 18, 1993, U.S. Appl. No. 07/943,264 (8 pp).
Office Action dated Nov. 15, 1993, U.S. Appl. No. 07/943,264 (6 pp).
Response to Office Action dated Nov. 15, 1993, U.S. Appl. No. 07/943,264 (8 pp).
Notice of Allowance dated Apr. 1, 1994, U.S. Appl. No. 07/943,264 (4 pp).
Office Action dated Apr. 18, 1994, U.S. Appl. No. 07/943,264 (5 pp).
Office Action dated May 3, 1994, U.S. Appl. No. 07/943,264 (7 pp).
Response to Office Action dated May 3, 1994, U.S. Appl. No. 07/943,264 (6 pp).
Office Action dated Jun. 30, 1994, U.S. Appl. No. 07/943,264 (6 pp).
Response to Office Action dated Jun. 30, 1994, U.S. Appl. No. 07/943,264 (8 pp).
Office Action dated Oct. 18, 1994, U.S. Appl. No. 07/943,264 (14 pp).
Response to Office Action dated Oct. 18, 1994, U.S. Appl. No. 07/943,264 (10 pp).
Office Action dated Apr. 10, 1995, U.S. Appl. No. 07/943,264 (5 pp).
Response to Office Action dated Apr. 10, 1995, U.S. Appl. No. 07/943,264 (9 pp).
Notice of Allowance dated Sep. 5, 1995, U.S. Appl. No. 07/943,264 (6 pp).
Response to Notice of Allowance dated Sep. 5, 1995, U.S. Appl. No. 07/943,264 (1 p).
Office Action dated Feb. 7, 1996, U.S. Appl. No. 08/474,872 (10 pp).
Response to Office Action dated Feb. 7, 1996, U.S. Appl. No. 08/474,872 (5 pp).
Office Action dated Aug. 1, 1996, U.S. Appl. No. 08/474,872 (7 pp).
Response to Office Action dated Aug. 1, 1996, U.S. Appl. No. 08/474,872 (7 pp).
Notice of Allowance dated Nov. 12, 1996, U.S. Appl. No. 08/474,872 (2 pp).
Supplemental Notice of Allowability dated Mar. 13, 1997, U.S. Appl. No. 08/474,872 (4 pp).
Office Action dated Feb. 7, 1996, U.S. Appl. No. 08/476,974 (9 pp).
Response to Office Action dated Feb. 7, 1996, U.S. Appl. No. 08/476,974 (7 pp).
Office Action dated Aug. 1, 1996, U.S. Appl. No. 08/476,974 (6 pp).
Response to Office Action dated Aug. 1, 1996, U.S. Appl. No. 08/476,974 (5 pp).
Notice of Allowability dated Jun. 20, 1997, U.S. Appl. No. 08/476,974 (3 pp).
Office Action dated Dec. 11, 1995, U.S. Appl. No. 08/479,269 (7 pp).
Response to Office Action dated Dec. 11, 1995, U.S. Appl. No. 08/479,269 (6 pp).
Office Action dated Jun. 11, 1996, U.S. Appl. No. 08/479,269 (8 pp).
Response to Office Action dated Jun. 11, 1996, U.S. Appl. No. 08/479,269 (7 pp).
Office Action dated Oct. 10, 1996, U.S. Appl. No. 08/479,269 (8 pp).
Response to Office Action dated Oct. 10, 1996, U.S. Appl. No. 08/479,269 (6 pp).
Office Action dated Mar. 10, 1998, U.S. Appl. No. 08/791,739 (5 pp).
Response to Office Action dated Mar. 10, 1998, U.S. Appl. No. 08/791,739 (3 pp).
Office Action dated Jul. 23, 1998, U.S. Appl. No. 08/791,739 (4 pp).
Response to Office Action dated Jul. 23, 1998, U.S. Appl. No. 08/791,739 (6 pp).
Office Action dated Jan. 19, 1999, U.S. Appl. No. 08/791,739 (4 pp).
Response to Office Action dated Jan. 19, 1999, U.S. Appl. No. 08/791,739 (5 pp).
Office Action dated Jun. 23, 1999, U.S. Appl. No. 08/791,739 (5 pp).
Response to Office Action dated Jun. 23, 1999, U.S. Appl. No. 08/791,739 (13 pp).
Notice of Allowance dated Dec. 21, 1999, U.S. Appl. No. 08/791,739 (4 pp).
Supplemental Notice of Allowability dated Mar. 1, 2000, U.S. Appl. No. 08/791,739 (4 pp).

* cited by examiner

PLANT GROWING ASSEMBLY

CROSS-REFERENCE TO RELATED APPLICATIONS

This application claims priority to U.S. Provisional Patent Application No. 61/084,311 filed on Jul. 29, 2008 and titled "Plant Growing Assembly," incorporated herein by reference.

STATEMENT REGARDING FEDERALLY SPONSORED RESEARCH OR DEVELOPMENT

Not applicable.

BACKGROUND

1. Field of the Invention

This invention relates generally to the field of growing plants in climate controlled facilities. More specifically, the invention relates to a method of growing plants in a growing room.

2. Background of the Invention

The commercial process of planting, germinating and hardening of plantlets typically occurs in large greenhouses. During this process, individual plantlets are grown in small plastic liners dispersed across a flat. The flats themselves are distributed throughout the greenhouse on various racks or benches at a uniform height. This arrangement creates a number of inefficiencies in the growing process including obstruction of light, dead air space among adjacent plants and poor light transmission through the flats. Additionally, the care for the plants requires extra manual labor to move the liners and remove the plants from the liners.

A growing room such as disclosed by Kertz, U.S. Pat. No. 5,511,340, incorporated herein by reference, demonstrates a greenhouse structure for increasing productivity by vertically arranging and growing plantlets on hanging sheets.

There is a need to grow plants for extended periods of time in a controlled environment. For example, growing systems are needed for growing livestock feed, grains, and food crops in a controlled environment over extended periods of time. Furthermore, as the population continues to increase and urban areas expand, the demand for food crops will increase. There is also the need to address the spatial requirements of plants developing beyond the seedling or sprout stage and do not require removal of germinated plantlets from the facility for replanting. Further there is a need for a growing system that allows the private homeowner to grow plants in high density urban areas to cultivate fresh produce.

Consequently, there is a need for a new vertical growing apparatus to maximize the benefits of the vertical arrangements of a growing room.

BRIEF SUMMARY

An apparatus and method for growing plants in a growing room includes a hanging member having a substantially planar configuration, oriented vertically. At least one carriage is disposed on the hanging member to support growing plants. A nutrient delivery system has a conduit to deliver nutrients to the hanging member and to recycle any unused nutrients.

In a further embodiment, an apparatus for supporting growing containers in the grow room comprises a support skeleton adapted to be vertically supported in the grow room, the skeleton includes at least one tensile support member and one or more racks to support the growing containers.

In additional embodiments, a nutrient dispensing system to dispense nutrients to plants comprises a conduit communicating with a pump. The pump communicates with a supply of nutrients and the conduit has a plurality of nozzles to spray the nutrients onto the plants as they move on a track through the grow room. A reservoir collects unused nutrients and communicates with the supply. Additionally, the reservoir extends for a distance under the track in the grow room to catch excess nutrient runoff and dripping for recycling it through the system.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
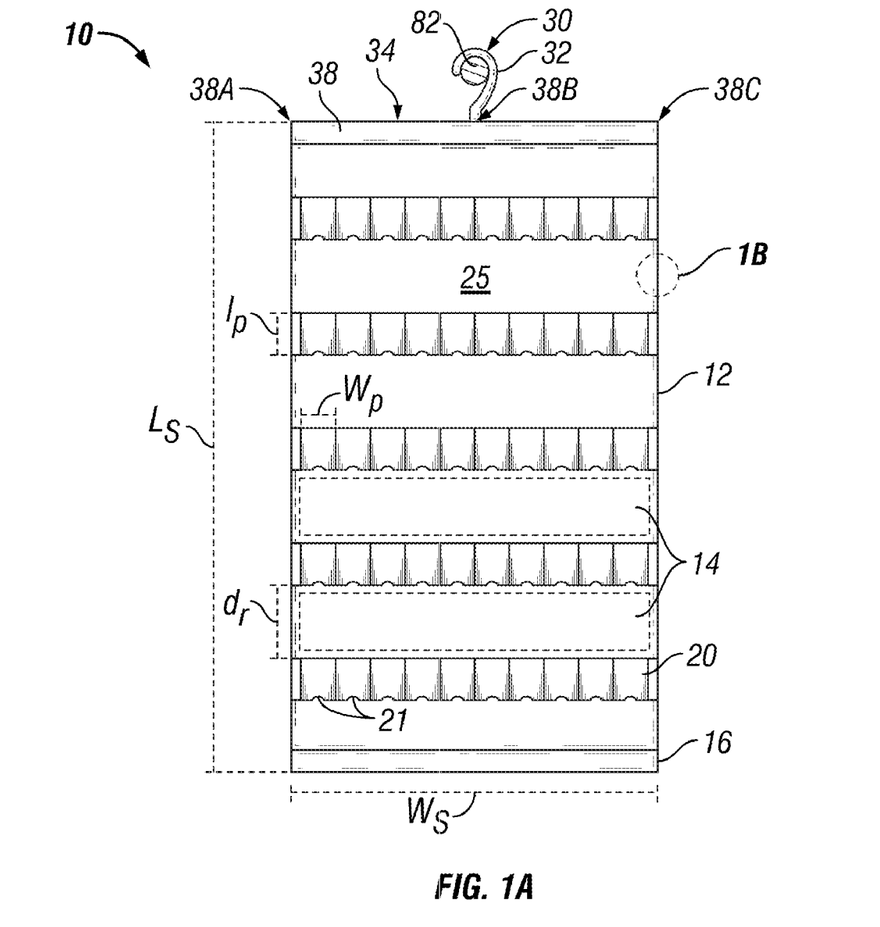
FIG. 1A illustrates a frontal view of a growing sheet for a grow room.

Referring initially to FIG. 1, there is shown an embodiment of a plant growing apparatus 10 of the plant growing assembly. The plant growing apparatus 10 includes a planar sheet 12 having a plurality of plant holders 20 attached thereto for supporting plants in plant media. The sheet 12 may be of any material capable of supporting the weight of the growing media and plants. In embodiments the material of sheet 12 is translucent or light penetrable, such as translucent polymers or plastics. For the propagation of light through a growing room or greenhouse, the material of sheet 12 is substantially translucent such that the plants receive light to grow.

In alternative embodiments, the sheet 12 includes areas without material such as cut outs 14. These cutouts 14 are configured to allow the maximal passage of light and gases to the plant without impeding the plant's growth, or compromising the structural integrity of the sheet 12.

Additionally, it is preferable that the sheet 12 be made of a material that is gas permeable. Synthetic polymers, such as polyethylene, polypropylene, ABS plastic, poly-acrylic plastic or others, are known to one skilled in the art to be gas permeable and translucent.

In embodiments plant growing apparatus 10 has a width $W_s$ of between about three feet and about six feet, preferably between about three feet and about four feet. In further embodiments the plant growing apparatus may have a length $L_s$ that is between about four feet and about twelve feet, with a preferred length of about ten feet to about eleven feet. It can be envisioned that the plant growing apparatus 10 has alternate dimensions dependent on the user, the plants, the purpose, and the material from which the sheet 12 is constructed.

Further, disposed at and incorporated in the lower edge of the growing sheet 12 is a tension weight 16. The tension weight 16 may include a bar, rod, or other rigid linear material configured for applying a slight tension to the sheet 12 and holding the plant growing apparatus 10 in a generally vertical and planar configuration.

In an embodiment the sheet 12 and holders 20 are constructed from biological polymers such as an organic, renewable alternative to petroleum based polymer material. Cellulose, starch, soy plastics and pressed peat are biological polymers capable of being constructed as a sheet 12 and holder 20 to support the growing plants. In preferred embodiments, the sheets 10 and holders 20 are constructed of cellulose. Cellulose from plant and microbial origins is edible by the Bovidae family, including cows, goats, sheep and the like, as well as pigs. By growing important live stock feeds or feed supplements like oats, barley, alfalfa and wheat grass, the sheets 10 and holders 20 can be fed to the animals intact. This represents a labor saving step as the entire sheet 10 and holders 20 can be fed to the animal, and the plants will not have to be harvested from the plant growing apparatus 10.

Figure 1B:
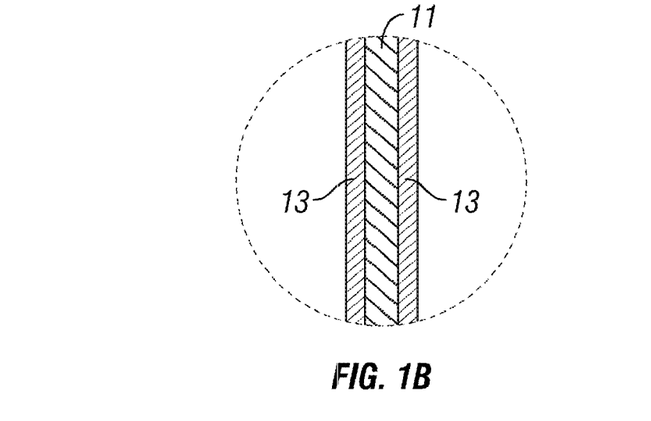
FIG. 1B is a cross-sectional view of the growing sheet at Detail 1B shown in FIG. 1A.

In further embodiments illustrated in cross-section in the FIG. 1B, the sheet 12 may be layered and have an inner core sheet 11 of polymeric material for supporting the sheet 12, and a removable inner and/or outer covering sheet 13 of an alternate material for supporting the growth of the plants. For example, the inner core sheet 11 may be comprised of a woven polypropylene strands, and the inner and/or outer covering sheets 13 may be comprised of cellulose.

In certain embodiments, a seed is integrated into the surface of the sheet 12 and/or holder 20. In order to integrate or insert seeds into the vertical surface 25 of the sheet 12 or into the holder 20, the material has to be loosely woven, or have a loose matrix of material. The loose matrix allows the roots of a growing plant to anchor the plant in the material of the sheet 12 and/or holder 20. By integrating the seeds into the surface of the material, it can be quickly removed as a whole and fed to livestock. Further, the sheet 12 and holder 20 act as a means to protect the seed while the seeds germinate. Grains in particular benefit from the seed integration into the material of sheet 12 and/or holder 20, as they tend to be grass like and capable of growing to high densities in a short amount of time. Additionally, grains are major staples of livestock diets. In further applications, the plant growing apparatus 10 with integrated seeds may be sold to private customers who can lay out the sheets in a garden.

Further, the plant growing apparatus 10 comprises a means for supporting growing plants in a growing media on the vertical face 25 of the supporting sheet 12. The plant support structure or plant holder 20 may be a pouch, a pocket, a scoop or similar structure disposed on sheet 12, suitable for retaining growing media without limitation. The plant holder 20 may be analogous to the growing cells described in U.S. Pat. No. 5,511,340 to Kertz. The plant holder 20 is constructed of a material preferably impermeable to water, but allows gas exchange such as a polymer, plastic, or other material. Although the material used to construct the plant holder 20 is impermeable to water, the plant holder 20 is constructed to allow water passage through the growing media. In alternative embodiments, the support structure or plant holder 20 is permeable to liquids and gases, such as a net or woven material.

In embodiments plant holder 20 may have a width $w_p$ between about one inch and about one foot. The plant holder 20 may have a length $l_p$ between about two inches and about two feet. This range of dimensions is exemplary as the plant holder 20 is variable in size dependent on the plant or plants being grown on the plant growing apparatus 10. In further embodiments rows of plant holders 20 are spaced distance $d_r$ apart. Distance $d_r$ being sufficient to allow the plants to grow vertically from holder 20 without interference.

The plant holder 20 is sufficiently sized to hold a seedling, and in further embodiments the plant holder 20 is large enough to hold a small plant. While preferable to grow microgreens, bean plants, herbs, spices and other small vegetable plants, it can be envisioned that the plant growing apparatus 10 is capable of supporting mature plants.

Without being limited by theory, it is possible to entirely prevent gas exchange at the root level in a plant by increasing the moisture content of the growing media to a point of saturation. This situation is unfavorable for the process of growing plants and makes a means of draining excess water from the growing media preferable. Thus the holders 20 include a drain 21 to remove excess water.

The plant growing apparatus 10 is supported vertically by a hanging means 30. The hanging means 30 includes a hanging member 32 and sheet attachment member 34. The hanging member 32 may be a hook, a loop or a clasp to vertically support the weight of the plant growing apparatus 10 and the sheet attachment member 34 may include a clamp, rod or bar. The hanging member 30 may be affixed to the plant growing apparatus 10 by various means. In an embodiment, the upper end of sheet 12 is folded over at 36 and heat sealed to form a loop that receives a rod or bar 38 coupling the sheet 12 to the bar 38 between ends 38A and 38C. The hanging member 32 passes through an opening in the loop and is coupled to the center point 38B of the bar 38.

Figure 2:
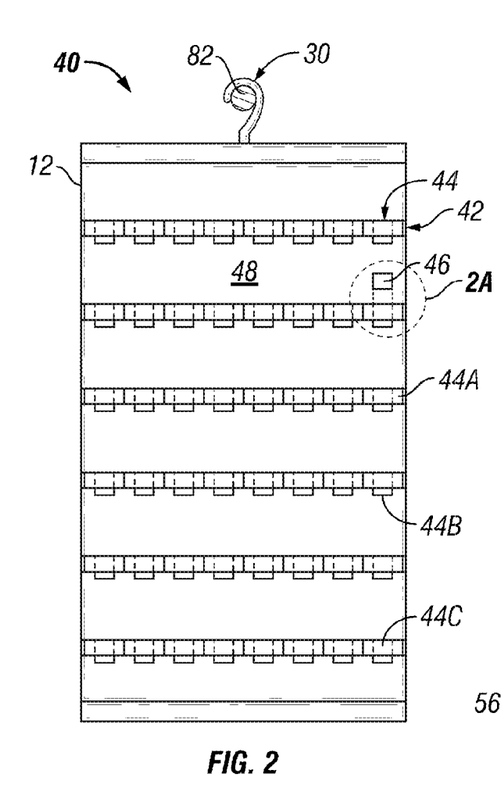
FIG. 2 illustrates a frontal view of the growing sheet for mature or potted plants for a grow room.

Referring now to FIG. 2, there is shown another embodiment of the plant growing apparatus. Plant growing apparatus 40 includes a planar sheet 12 of material with the plant holder 20 configured as a plant container support 42 having a pocket 44 to receive and hold a rockwool grow cube 46, such as those manufactured by Grodan® Hydroponics, with a plant. Rockwool is a fibrous mineral wool with high water retention and gas permeability properties. The grow cubes 46 can be between about two inches and about six inches. In embodiments a plant growing apparatus 40 can support between about 80 and about 120 rockwool cubes 46.

Figure 2A:
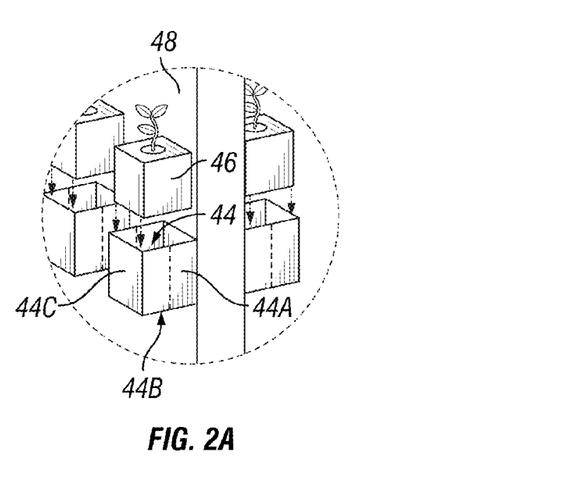
FIG. 2a illustrates a side view of the growing sheet for mature or potted plants for a grow room.

The pocket 44 is constructed of the same material as the sheet 12 and is capable of folding flat against the grow sheet 12. In certain embodiments, the pocket 44 is affixed to the sheet 12 with adhesive and folds flat against the sheet in a T-shaped configuration. The pocket sides 44A fold in half vertically, and the pocket bottom 44B folds in half laterally such that outer face 44C fits flush against the face 48 of vertical sheet 12. In embodiments illustrated in FIG. 2A, the pocket unfolds to provide the pocket 44 for rockwool cubes 46.

Figure 3:
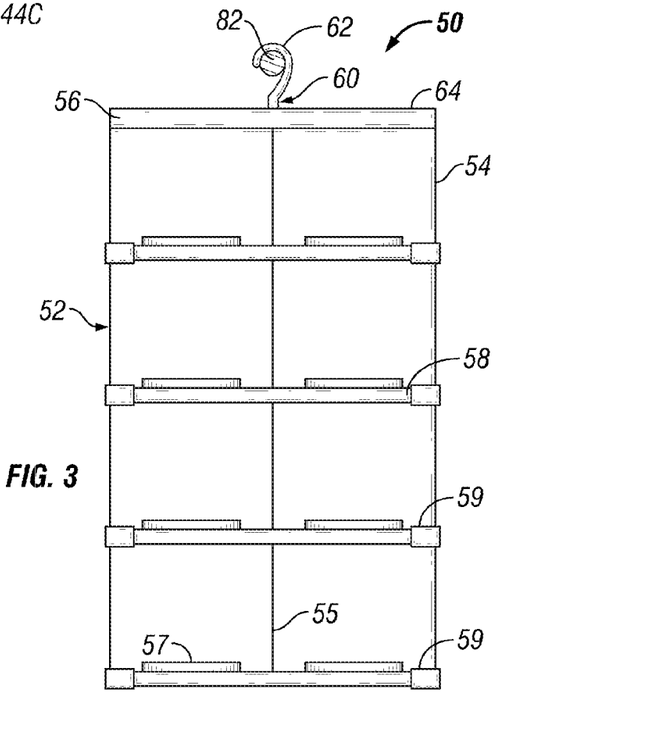
FIG. 3 illustrates a frontal view of a skeleton support for plants.

Referring now to FIG. 3, there is shown a plant growing apparatus in the form of a skeleton support 50 to hold plants. The skeleton support sheet 50 includes a frame 52 having vertically extending load carriers 54 coupled by an upper support bar 56 and a plurality of racks 58. The vertically extending load carriers 54 may be any structure and material suitable for tensile support of loads. Rope, wire, chains, rods or bars are exemplary structures without limitation. Suitable materials include metals and plastics and, alloys and composites utilizing combinations thereof. In further embodiments the vertical load carriers 54 may be of a rigid material.

Racks 58 are configured to create a horizontal shelf for the placement of growing plants supported on skeleton support 50. The racks 58 are coupled to the vertical load carriers 54 by fasteners 59 and disposed between the racks 58 parallel to the ground. Fasteners 59 may comprise a screw, a bolt, a rivet, weld or any other means to affix a rack 58 to a vertical load carrier 54 as known to one skilled in the art. In further embodiments, the rack 58 and vertical load carrier 54 may be molded as a single entity. In embodiments, the racks 58 may be further supported by at least one supplementary load carrier 55, located between the vertical load carriers 54.

A horizontal shelf or rack 58 containing at least one liner or base 57 for the support of a potted plant. In further embodiments the base 57 comprises a pot for retention of a growing media and plant. The number of horizontal racks 58 is variable depending upon the type of plants being grown and the expected size of the mature plant. The dimensions of the skeleton 50 are similar to the plant growing apparatus 10, so as to fit in a grow room. In further embodiments, the hanging skeleton supports 50 can be interspaced between plant growing apparatus 10 and 30 in a growing room.

The skeleton support 50 is supported vertically by a hanging means 60. The hanging means 60 includes a hanging member 62 and sheet attachment member 64. The hanging member 62 may be a hook, a loop or a clasp to vertically support the weight of the support 50 and the sheet attachment member 64 may include a clamp or other connection 66 connecting the hanging member 62 to the frame 52. In an embodiment, the hanging member 62 is connected to the upper support bar 56.

Figure 4:
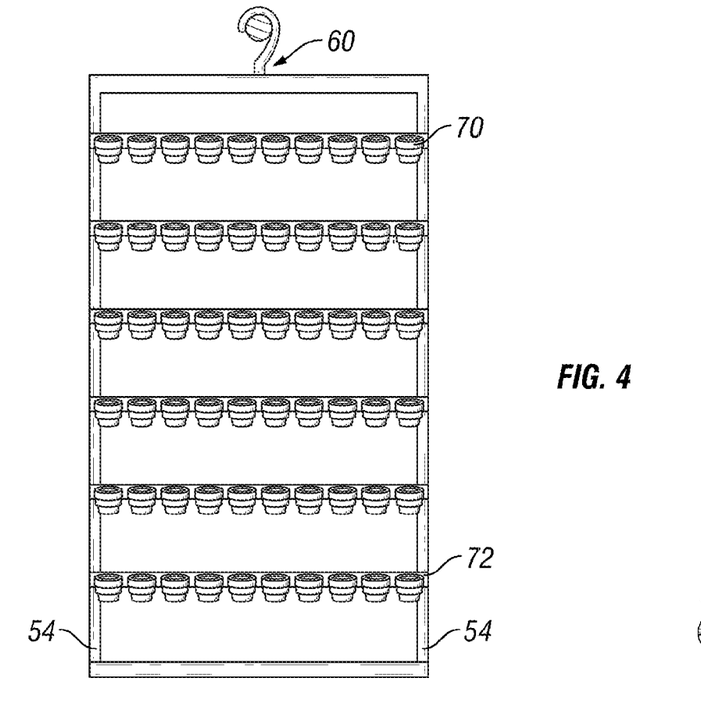
FIG. 4 illustrates a frontal view of the skeleton support of FIG. 3 with plant baskets.
Figure 5:
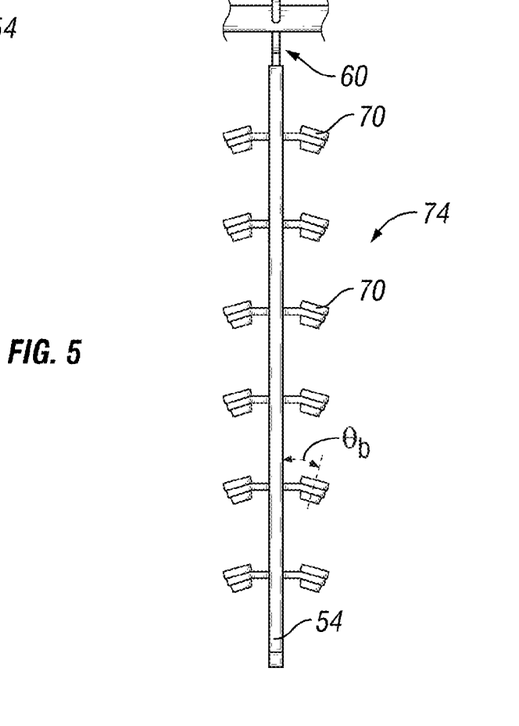
FIG. 5 illustrates a side view of the skeleton support of FIG. 4.

As illustrated in FIGS. 4 and 5, the racks 72 disposed between vertical load carriers 54, are designed for the support of baskets 70 to hold small growing pots. The baskets 70 may be configured to support the pots along their rim, their base, their pot sides or a combination thereof. In further embodiments the baskets 70 include circumferential braces as well as vertical supports. The baskets 70 are made of wire or other material and are configured to retain a pot for a plant. The pots between about two inches in diameter and about six inches in diameter, preferably between about two inches and about four inches in diameter, and most preferably between about three inches and about four inches in diameter. As illustrated in FIG. 5 the baskets 70 are positioned at a tilted angle $Ø_b$ relative to the skeleton 74. The tilt away from the vertically oriented skeleton 74 gives growing plants additional room for shoots, buds, and branching. The angle $Ø_b$ is between about 45 degrees from vertical and about one degree from vertical, preferably between about 10 degrees and about 30 degrees from vertical. In alternate embodiments, it can be envisioned angle $Ø_b$ can be moved or changed dependent on the plant species being grown.

Figure 6:
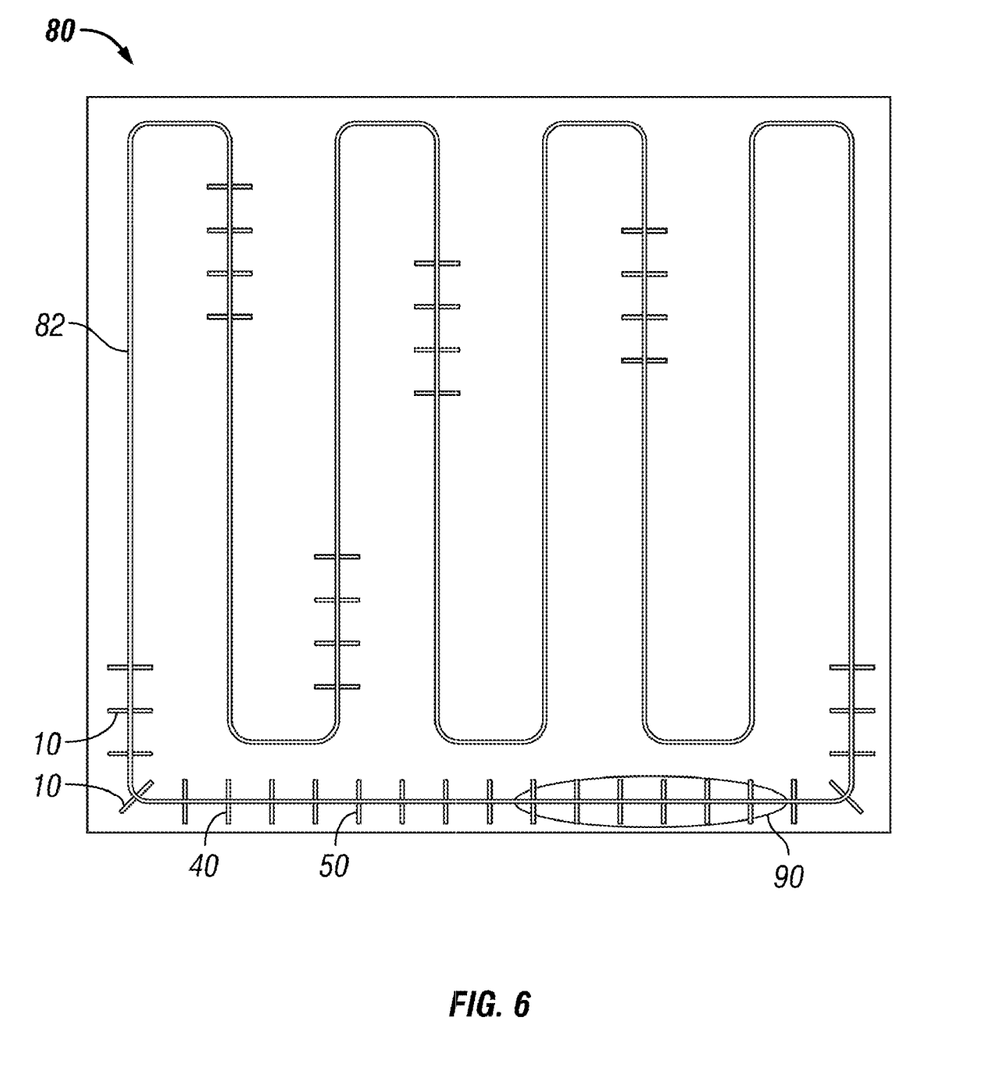
FIG. 6 is a schematic of a top view of the growing room.

Referring now to FIG. 6, there is shown is a grow room 80, similar to that disclosed in U.S. Pat. No. 5,511,340, for circulating grow sheets, such as plant growing apparatus 10, 40, 50 and 74. The grow room 80 includes a serpentine track 82 onto which is removably connected to the hanging means 30 and 60 of the plant growing apparatus 10, 40, 50 and 74. The track moves so as to moveably support the plant growing apparatus 10, 40, 50 and 74. In an embodiment, the hanging apparatus is a moving rack in a grow room such as shown in U.S. Pat. No. 5,511,340. The growing room 80 may be a greenhouse or other building with substantially translucent walls and roof. The grow room 80 may include growing lights for continuing operations during winter months or implementation in a warehouse-like structure. Additionally, a heating, ventilation and air conditioning system circulates air through the grow room and maintains an ideal growing temperature range for the plants grown on plant growing apparatus 10, 40, 50 and 74.

Figure 7:
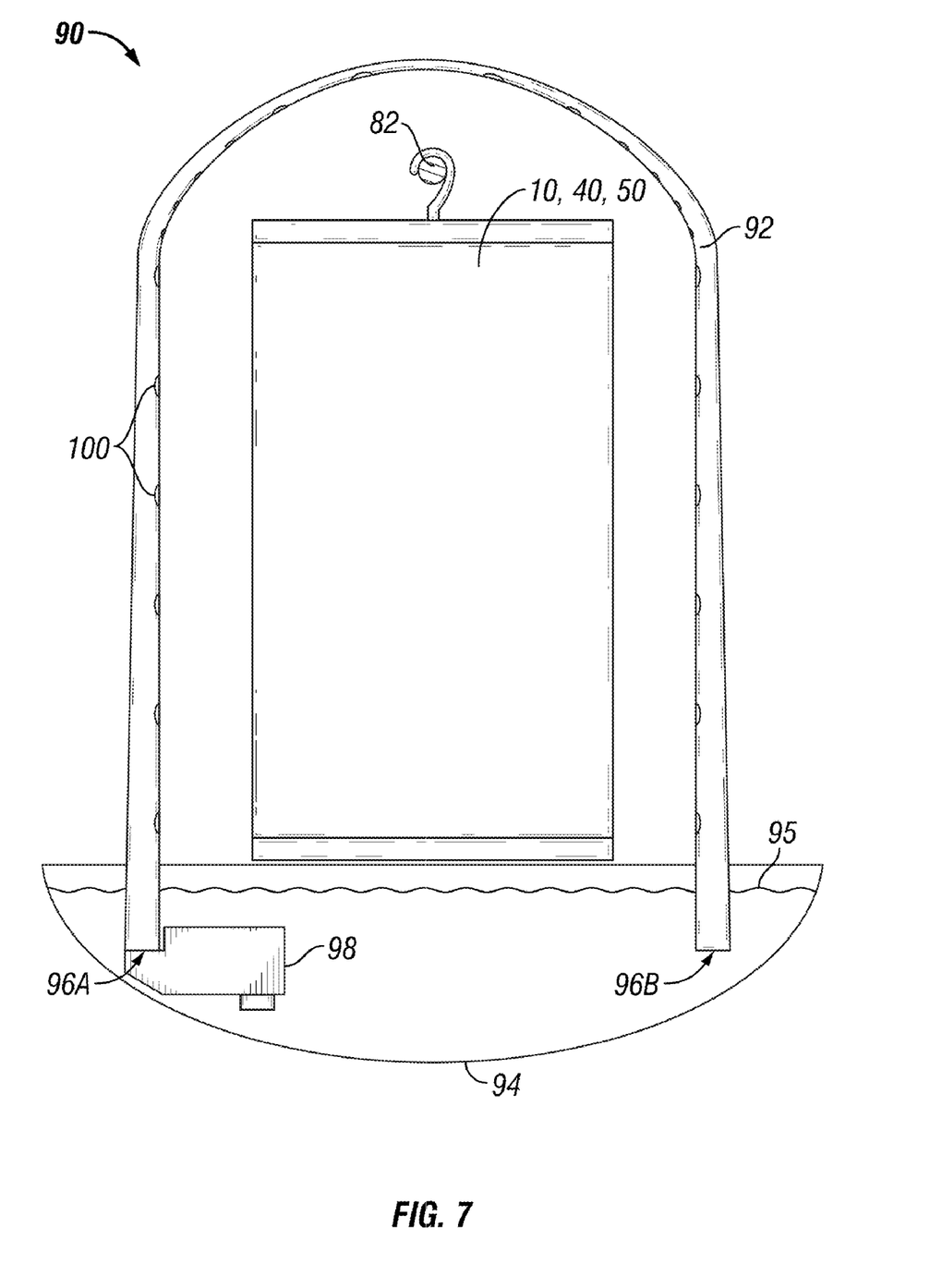
FIG. 7 illustrates an inline elevation view of a water recycling system for a grow room.
Figure 8:
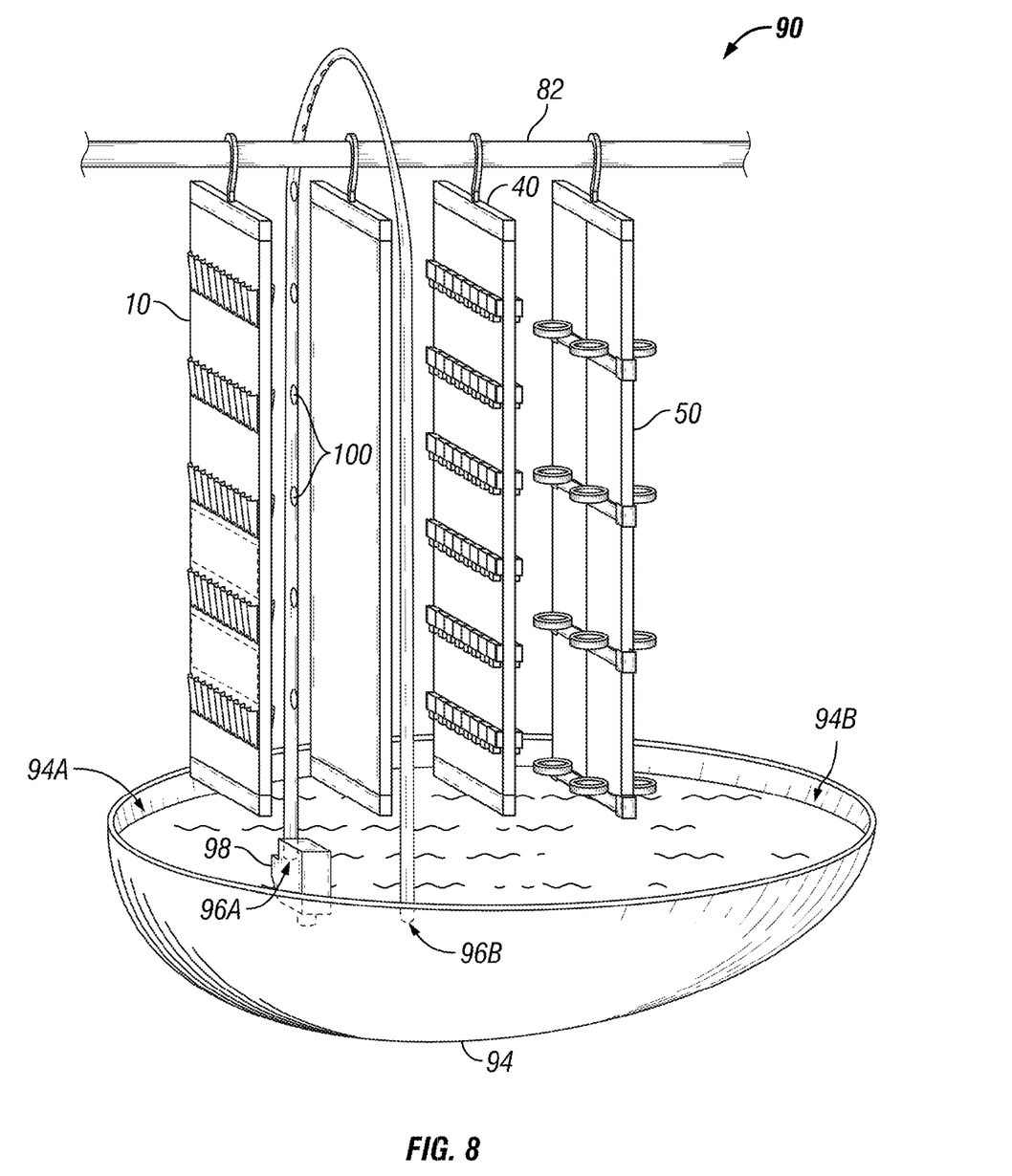
FIG. 8 is a perspective side view of a water recycling system for a grow room.

During circulation, it is necessary for the plant growing apparatus 10, 40, 50 and 74 to be provided with water, fertilizers, nutrients and other chemicals at controlled intervals. In embodiments a nutrient dispensing assembly 90, as shown in FIGS. 7 and 8, is used to provide liquid nutrients to the plant growing apparatus 10, 40, 50 and 74. Large ceiling mounted sprinkler systems are effective for providing the grow sheets liquid nutrients through the grow room however they allow much of the liquid sprayed to be lost down the drain. A fogging or misting system, such as the System 1000 Micro-Mist System manufactured by Baumac International of Mentone, Calif. disclosed in U.S. Pat. No. 5,511,340, may be used to maintain a humidity of about 70% or more in the growing room.

It should be appreciated that the plant growing apparatus 10, 40, 50 and 74 may be hung from any member such as a tree branch, home awning or other outdoor structure. The hanging apparatus may be a fixed structure, such as a ceiling truss in a green house. The grow room 80 may be used for any plant growing apparatus for growing plants, including those previously-described herein, that are moveably circulated through a grow room in order to expose them to light.

As illustrated in FIGS. 7 and 8, the plant growing assembly includes the nutrient dispensing assembly 90 where the plant growing apparatus 10, 40, 50 and 74 pass under a dispensing conduit or loop 92 and over a holding reservoir 94. The loop 92 has a first end 96A and a second end 96B disposed below the surface 95 of the fluid in the reservoir 94. The loop 92 is disposed about the plant growing apparatus 10, 40, 50 and 74 and the hanging apparatus 30, 60. In alternative embodiments, the loop 92 may be disposed as a semi-loop, or only partially disposed about the plant growing apparatus 10, 40, 50 and 74 circulation path. The first end 96A may be coupled to a pump 98 and in fluid communication with the holding reservoir 94. The pump 98 pumps water and nutrients through the dispensing loop 92 at a pressure sufficient to create a spray from nozzles 100 disposed on loop 92. The second end of the loop 96B is a structure configured to maintain fluid pressure throughout the loop 92. In embodiments the second end 96B may include an additional pump to pump fluid through the dispensing loop 92.

The reservoir 94 includes a first end 94A and a second end 94B with first end 94A of the reservoir 94 being functionally deeper than the second end 94B. The first end 94A has the loop ends 96A and 96B located more proximally thereto. The second end 94B of the reservoir 94 is elongated and shallow, as a means of collecting the excess dripping liquid from the grow sheets as they continue to move through the grow room 80 along the track 82 of the grow room 80. In further embodiments, the reservoir second end 94B extends along the path of the track 82 for an elongate distance. In certain embodiments, the distance is between about 12 feet and about 100 feet. In these instances, the second end 94B remains sloped toward the first end 94A such that water will flow downhill into the deeper end 94A of the reservoir 94.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

We claim:

1. An apparatus for growing plants, the apparatus comprising:
    a hanging member having a substantially planar configuration, oriented vertically, having at least one face, wherein the hanging member comprises an upper support member configured to vertically support the weight of the hanging member;
    a plurality of support members disposed on the hanging member at a plurality of vertical heights to support growing plants on the at least one face; and
    a nutrient delivery system, having a conduit loop to deliver nutrients to the hanging member, having a vessel to capture and recycle unused nutrients from the vessel to the conduit loop, and a conduit to recycle any unused nutrients, wherein the hanger member travels through the conduit loop to spray liquid nutrients onto the hanging member.
2. The apparatus of claim 1 wherein the hanging member comprises a support sheet coupled to the at least one face.
3. The apparatus of claim 2 wherein the support sheet comprises a plurality of layers of translucent material.
4. The apparatus of claim 2 wherein the support sheet is edible by livestock.
5. The apparatus of claim 4 wherein the support sheet is made from a biological polymer chosen from cellulose, starches, soy, peat derivatives and combinations thereof.
6. The apparatus of claim 2 wherein the support sheet comprises at least one layer disposed on at least one face, wherein the at least one layer is a removable outer layer.
7. The apparatus of claim 6 wherein the growing plant is integrated directly into the face of the layer.
8. The apparatus of claim 7 wherein the growing plant further comprises a seed.
9. The apparatus of claim 7, wherein the outer layer is configured for placement on the ground.
10. The apparatus of claim 6 wherein the at least one removable layer is edible by livestock.
11. The apparatus of claim 1 wherein the hanging member comprises a support skeleton, the support skeleton having supports to support the support members.
12. The apparatus of claim 1, further including one or more plant holders disposed on the plurality of support members.
13. The apparatus of claim 1 wherein:
    the conduit to deliver nutrients communicates with a pump;
    the pump communicating with a supply of nutrients;
    the conduit to deliver nutrients having a plurality of nozzles to spray the nutrients onto the plants;
    the vessel collecting unused nutrients; and
    the vessel being in communication with the supply.
14. The apparatus of claim 13, further comprising:
    a closed circuit for circulating the hanging member through a greenhouse growing room;
    the nutrient delivery system having a conduit loop with sprayers to spray liquid nutrients onto the plurality of support members, through which the closed circuit passes; and
    the vessel capturing excess nutrients dripping from the plurality of support members to recycle excess nutrients.
15. An apparatus for growing plants, the apparatus comprising:
    a hanging member having a substantially planar configuration, oriented vertically;
    the hanging member including a support skeleton adapted to be vertically supported in a grow room, the support skeleton including at least one tensile support member; and
    the support skeleton having a plurality of horizontal racks disposed at different vertical heights and disposed on opposite sides of the planar hanging member to support growing containers for growing plants at different heights within the grow room.
16. The apparatus of claim 15 wherein the support skeleton may be a rigid material or a flexible material.
17. The apparatus of claim 15 wherein the horizontal racks have two ends coupled to the support skeleton.
18. An apparatus for growing plants in a growing room, comprising:
    a hanging member adapted to be vertically suspended in the growing room;
    the hanging member having an upper support member, configured to vertically support the weight of the hanging member;
    at least two vertical load carriers having an end attached to the upper support member;
    a plurality of horizontal racks extending between the two vertical load carriers at different vertical heights and on opposite sides of the hanging member;
    fasteners connecting the horizontal racks to the load carriers; and
    a plurality of bases disposed on the horizontal racks and adapted to contain growing plants.
19. The apparatus of claim 18, wherein the hanging member comprises a support skeleton.
20. The apparatus of claim 19, wherein the support members are disposed on the support skeleton.
21. The apparatus of claim 20, wherein the support members comprise horizontal racks disposed on the support skeleton at a plurality of vertical heights to support growing plants.
22. The apparatus of claim 21, wherein the horizontal racks are configured to support plant containers.
23. The apparatus of claim 21, wherein the horizontal racks are rigid.

24. The apparatus of claim 21, wherein the horizontal racks are disposed on opposite sides of the support skeleton.

25. The apparatus of claim 24, wherein the horizontal racks are configured to support a plurality of bases.

26. The apparatus of claim 25, wherein the plurality of bases are configured to support potted plants.

27. An apparatus for growing plants, the apparatus comprising:

a hanging member having a substantially planar configuration, oriented vertically, having at least one face;

a plurality of support members disposed on the hanging member at a plurality of vertical heights to support growing plants on the at least one face;

a closed circuit for supporting and circulating a plurality of hanging members through a green house; and a nutrient delivery system, having a conduit loop to deliver nutrients to the hanging member, having a vessel to capture and recycle unused nutrients from the vessel to the conduit loop, and a conduit to recycle any unused nutrients.

* * * * *